(12) United States Patent
Jacobson

(10) Patent No.: US 12,491,011 B1
(45) Date of Patent: Dec. 9, 2025

(54) SYSTEMS AND METHODS FOR SPINAL FIXATION

(71) Applicant: Mark Jacobson, PLLC, Bloomfield Hills, MI (US)

(72) Inventor: Mark Jacobson, Bloomfield Hills, MI (US)

(73) Assignee: Mark Jacobson, PLLC, Bloomfield Hills, MI (US)

( * ) Notice: Subject to any disclaimer, the term of this patent is extended or adjusted under 35 U.S.C. 154(b) by 0 days.

(21) Appl. No.: 19/265,048

(22) Filed: Jul. 10, 2025

Related U.S. Application Data (60) Provisional application No. 63/746,355, filed on Jan. 17, 2025.

(51) Int. Cl.
*A61B 17/70* (2006.01)
*A61B 17/00* (2006.01)

(52) U.S. Cl.
CPC ...... *A61B 17/7032* (2013.01); *A61B 17/7091* (2013.01); *A61B 2017/00867* (2013.01)

(58) Field of Classification Search
CPC ............ A61B 17/7091; A61B 17/8685; A61B 17/1725; A61B 17/8655; A61B 17/7032
See application file for complete search history.

(56) References Cited

U.S. PATENT DOCUMENTS

| | | |
|---|---|---|
| 7,008,428 B2 | 3/2006 | Cachia et al. |
| 8,734,497 B2 | 5/2014 | Goel et al. |
| 10,499,969 B2 * | 12/2019 | McGirt ............... A61B 17/7032 |
| 2006/0036248 A1 | 2/2006 | Ferrante et al. |
| 2007/0198018 A1 * | 8/2007 | Biedermann ...... A61B 17/7032 606/139 |
| 2009/0105771 A1 * | 4/2009 | Lei ..................... A61B 17/8625 606/301 |
| 2009/0125028 A1 * | 5/2009 | Teisen ................... A61B 17/68 606/62 |
| 2010/0057141 A1 * | 3/2010 | Abdelgany ........ A61B 17/8685 606/301 |

(Continued)

FOREIGN PATENT DOCUMENTS

| | | |
|---|---|---|
| CN | 2915048 Y | 6/2007 |
| CN | 201734771 U | 2/2011 |

(Continued)

OTHER PUBLICATIONS

Beyond the Pedicle Screw—A Patent Review_Esther P. de Kater_European Spine Journal 2022.

*Primary Examiner* — Jacqueline T Johanas
(74) *Attorney, Agent, or Firm* — Harness, Dickey & Pierce, P.L.C.

(57) ABSTRACT

A spinal fixation system including: a pedicle screw including a screw head, a screw tip opposite to the screw head, a screw body extending from the screw head to the screw tip, and a channel extending from a first opening defined in the screw head to a second opening defined at a side of screw body; a tulip head defining a cavity configured to accommodate the screw head, and defining a slot configured to accommodate a fixation rod; a nail including a nail head, a nail tip, and a nail body extending from the nail head to the nail tip, the nail body including a curved portion that is flexible; and an inserter for the nail configured to cooperate with the tulip head.

20 Claims, 6 Drawing Sheets

(56) References Cited

U.S. PATENT DOCUMENTS

| | | | | | |
|---|---|---|---|---|---|
| 2010/0324607 | A1* | 12/2010 | Davis | | A61B 17/8625 606/313 |
| 2011/0066190 | A1* | 3/2011 | Schaller | | A61B 17/7266 606/301 |
| 2011/0098747 | A1* | 4/2011 | Donner | | A61F 2/4455 606/264 |
| 2012/0197315 | A1* | 8/2012 | Kim | | A61B 17/8685 606/305 |
| 2013/0310883 | A1* | 11/2013 | Levy | | A61B 17/863 606/313 |
| 2015/0066097 | A1* | 3/2015 | Biedermann | | A61B 17/846 606/304 |
| 2015/0134016 | A1* | 5/2015 | Biedermann | | A61B 17/846 606/323 |
| 2015/0250506 | A1* | 9/2015 | Philippon | | A61B 17/8685 606/64 |
| 2018/0140340 | A1* | 5/2018 | McGirt | | A61B 17/846 |
| 2019/0125409 | A1* | 5/2019 | Bohl | | A61B 17/8625 |
| 2021/0030453 | A1* | 2/2021 | Bohl | | A61B 17/8685 |
| 2021/0228250 | A1* | 7/2021 | Suddaby | | A61B 17/869 |
| 2021/0307924 | A1* | 10/2021 | Glerum | | A61B 17/68 |
| 2022/0104858 | A1* | 4/2022 | Ball | | A61B 17/8685 |
| 2022/0257295 | A1* | 8/2022 | Fagan | | A61B 17/864 |
| 2023/0165612 | A1* | 6/2023 | Castro | | A61B 17/846 606/328 |
| 2023/0277230 | A1* | 9/2023 | Fagan | | A61F 2/0811 623/13.14 |
| 2023/0320867 | A1* | 10/2023 | Weiman | | A61B 17/8685 623/17.11 |

FOREIGN PATENT DOCUMENTS

| | | | | |
|---|---|---|---|---|
| CN | 205163222 U | | 4/2016 | |
| CN | 205831898 U | | 12/2016 | |
| CN | 103860251 B | | 1/2017 | |
| CN | 108013923 A | * | 5/2018 | ......... A61B 17/8685 |
| CN | 108095816 A | * | 6/2018 | ............. A61B 17/86 |
| CN | 108553159 A | * | 9/2018 | ......... A61B 17/8685 |
| CN | 111658167 B | | 8/2021 | |
| CN | 114587549 A | * | 6/2022 | ........... A61B 17/683 |
| CN | 217772481 U | | 11/2022 | |
| GB | 2444705 A | * | 6/2008 | ............... F16B 39/34 |
| WO | WO-2011025098 A1 | * | 3/2011 | ........... A61B 17/864 |
| WO | WO-2014058367 A1 | * | 4/2014 | ........... A61B 17/844 |
| WO | WO-2019161100 A1 | * | 8/2019 | ......... A61B 17/8685 |
| WO | WO-2024250064 A1 | * | 12/2024 | ......... A61B 17/7035 |

* cited by examiner

SYSTEMS AND METHODS FOR SPINAL FIXATION

CROSS-REFERENCE TO RELATED APPLICATIONS

This application claims the benefit of U.S. Provisional Application No. 63/746,355, filed on Jan. 17, 2025. The entire disclosure of the above application is incorporated herein by reference.

FIELD

The present disclosure relates to systems and methods for spinal fixation.

BACKGROUND

This section provides background information related to the present disclosure, which is not necessarily prior art.

Spinal fixation systems stabilize the spine by attaching vertebrae together with various implants, such as rods, screws, plates, and/or hooks. Spinal fixation aims to restore alignment and reduce pain caused by various conditions including fractures, degenerative disc disease, tumors, deformities, etc. Spinal fixation systems prevent, or at least restrict, movement in the affected spinal segment until the bones fuse together through bone graft material.

SUMMARY

This section provides a general summary of the disclosure and is not a comprehensive disclosure of its full scope or all of its features.

The present disclosure provides for, in various features, a spinal fixation system including: a pedicle screw including a screw head, a screw tip opposite to the screw head, a screw body extending from the screw head to the screw tip, and a channel extending from a first opening defined in the screw head to a second opening defined at a side of screw body; a tulip head defining a cavity configured to accommodate the screw head, and defining a slot configured to accommodate a fixation rod; a nail including a nail head, a nail tip, and a nail body extending from the nail head to the nail tip, the nail body including a curved portion that is flexible; and an inserter configured to cooperate with the tulip head, the inserter including an inner cannula seated within an outer cannula that is movable relative to the inner cannula, the inner cannula including alignment members in cooperation with the outer cannula such that movement of the outer cannula relative to the inner cannula moves the alignment members from a stowed position to a deployed position, in the deployed position the alignment members are configured to center the nail when inserted within the inner cannula and straighten the curved portion of the nail to facilitate insertion of the nail through the tulip head and into the channel of the pedicle screw.

In further features, the channel and the nail are both rectangular in cross-section.

In further features, the screw body is tapered inward from the second opening of the channel to the screw tip.

In further features, the pedicle screw is configured such that when fully implanted in a vertebral body the second opening of the channel is beyond a junction between the vertebral body and a pedicle bone of the vertebral body.

In further features, the second opening of the channel is spaced apart 25-35 mm from a top surface of the screw head.

In further features, the tulip head further includes: a collar defining an aperture, when the screw head is locked within the cavity the screw body extends through the aperture and the collar is between the screw head and screw threads; and internal tulip threads adjacent to the slot configured to cooperate with a set screw to retain the fixation rod within the slot.

In further features, the nail is made of a shape-memory alloy.

In further features, the inner cannula of the inserter further includes distal threads and proximal threads at opposite ends of the inner cannula, the distal threads are configured to cooperate with tulip threads of the tulip head, and the proximal threads are configured to cooperate with a bolt; rotation of the bolt in a first direction presses the bolt against the outer cannula to slide the outer cannula towards the distal threads and move the alignment members from the stowed position to the deployed position; and rotation of the bolt in a second direction opposite to the first direction moves the bolt away from the outer cannula to allow the outer cannula to slide away from the distal threads and move the alignment members from the deployed position to the stowed position, and to allow the nail head to move past the alignment members.

In further features, the alignment members are pins rotatably mounted to the inner cannula, the pins are arranged in opposing pairs; in the deployed position, the pins of the opposing pairs are colinear; and in the stowed position, the pins are rotated relative to the deployed position such that opposing tips of the pins of the opposing pairs are spaced farther apart as compared to the deployed position.

In further features, the tulip head is rotatable about the screw head to align the slot with another slot of another tulip head implanted in an adjacent vertebral body.

In further features, the nail defines a window proximate to the nail head, the window configured to receive a removal tool for removing the nail.

The present disclosure also provides for, in various features, a method for implanting a spinal fixation system, the method including: implanting a pedicle screw in a vertebral body, the pedicle screw including a screw head, a screw tip opposite to the screw head, a screw body extending from the screw head to the screw tip, a channel extending from a first opening defined in the screw head to a second opening defined at a side of screw body, and a tulip head seated on the screw head; connecting an inserter to the tulip head of the pedicle screw, the inserter including an inner cannula seated within an outer cannula that is movable relative to the inner cannula, the inner cannula including alignment members in cooperation with the outer cannula such that movement of the outer cannula relative to the inner cannula moves the alignment members from a stowed position to a deployed position; arranging a nail inside the inner cannula of the inserter with the alignment members in the stowed position, the nail including a nail head, a nail tip, and a nail body extending from the nail head to the nail tip, the nail body including a curved portion that is flexible; with the nail inside the inner cannula, moving the outer cannula relative to the inner cannula to move the alignment members to the deployed position and into cooperation with the nail to straighten the curved portion; inserting the nail into the channel until the curved portion enters the channel; with the curved portion within the channel, moving the outer cannula relative to the inner cannula to move the alignment members from the deployed position to the stowed position to allow the nail head to pass the alignment members; further inserting the nail into the channel until the nail head is seated in the screw head and the nail body extends through the second opening and into the vertebral body to implant the nail within the vertebral body; decoupling the inserter from cooperation with the tulip head after the nail is implanted; mounting a fixation rod the tulip head over the nail head; and attaching a set screw to the tulip head over the fixation rod.

In further features, implanting the pedicle screw includes positioning the pedicle screw such that the second opening of the channel is implanted beyond a junction between the vertebral body and a pedicle bone of the vertebral body.

In further features, the method includes rotating the tulip head about the screw head to align a slot of the tulip head with another slot of another tulip head implanted in an adjacent vertebral body.

In further features, moving the outer cannula relative to the inner cannula to move the alignment members includes sliding the outer cannula relative to the inner cannula.

In further features, moving the outer cannula relative to the inner cannula to move the alignments members to the deployed position includes rotating a bolt on the inner cannula such that the bolt pushes the outer cannula towards the tulip head.

In further features, the method includes implanting the nail within the vertebral body such that the nail tip engages an endplate of the vertebral body.

In further features, the method includes implanting the nail within the vertebral body at a non-orthogonal angle relative to a longitudinal axis of the pedicle screw.

In further features, the alignment members are configured to align the nail along a longitudinal axis of the pedicle screw.

In further features, the vertebral body is a first vertebral body, the pedicle screw is a first pedicle screw, the tulip head is a first tulip head, and the nail is a first nail, the method further includes: implanting a second pedicle screw in a second vertebral body that is adjacent to the first vertebral body, the second pedicle screw is identical to the first pedicle screw; and inserting a second nail through the second pedicle screw and implanting the second nail within the second vertebral body. Mounting the fixation rod further includes mounting the fixation rod to a second tulip head connected to the second pedicle screw, and securing the fixation rod with another set screw in cooperation with the second tulip head.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Poly-axial pedicle screw instrumentation is used to provide rigid fixation across a motion segment. An exemplary motion segment includes two adjacent vertebral bodies and an intervertebral disc between them. In most cases, a goal of implanting spinal instrumentation is to achieve spinal fusion, which is characterized by bone growth extending from one vertebral body to another to fuse the vertebral bodies and permanently eliminate motion therebetween. Addition of spinal instrumentation to a fusion increases successful fusion rates to 80%, as opposed to 40% for uninstrumented fusion, and is associated with better long term clinical outcomes. Loss of spinal fixation, and failure of fusion, is a challenging complication to address and may require undesirable revision surgery.

Osteopenia and osteoporosis are common in the aging population, which introduces additional challenges when a spinal fusion with instrumentation is being considered. Spinal fixation in osteoporotic bone can be improved by using a larger diameter screw, using a higher thread pitch, and by augmenting the pedicle screw with bone cement. Addition of bone cement to a fenestrated pedicle screw is irreversible and future removal of the screw is challenging if possible.

The present disclosure provides for various systems and methods for motion segment fixation. Although the systems and methods are described herein in the context of spinal fixation, the systems and methods of the present disclosure may be configured to affix any suitable biological motion segment in additional to spinal fixation. The description of spinal fixation is thus provided for exemplary purposes only. The systems and methods of the present disclosure may be configured for fixation of any suitable non-spinal motion fixation segment as well.

Figure 1:
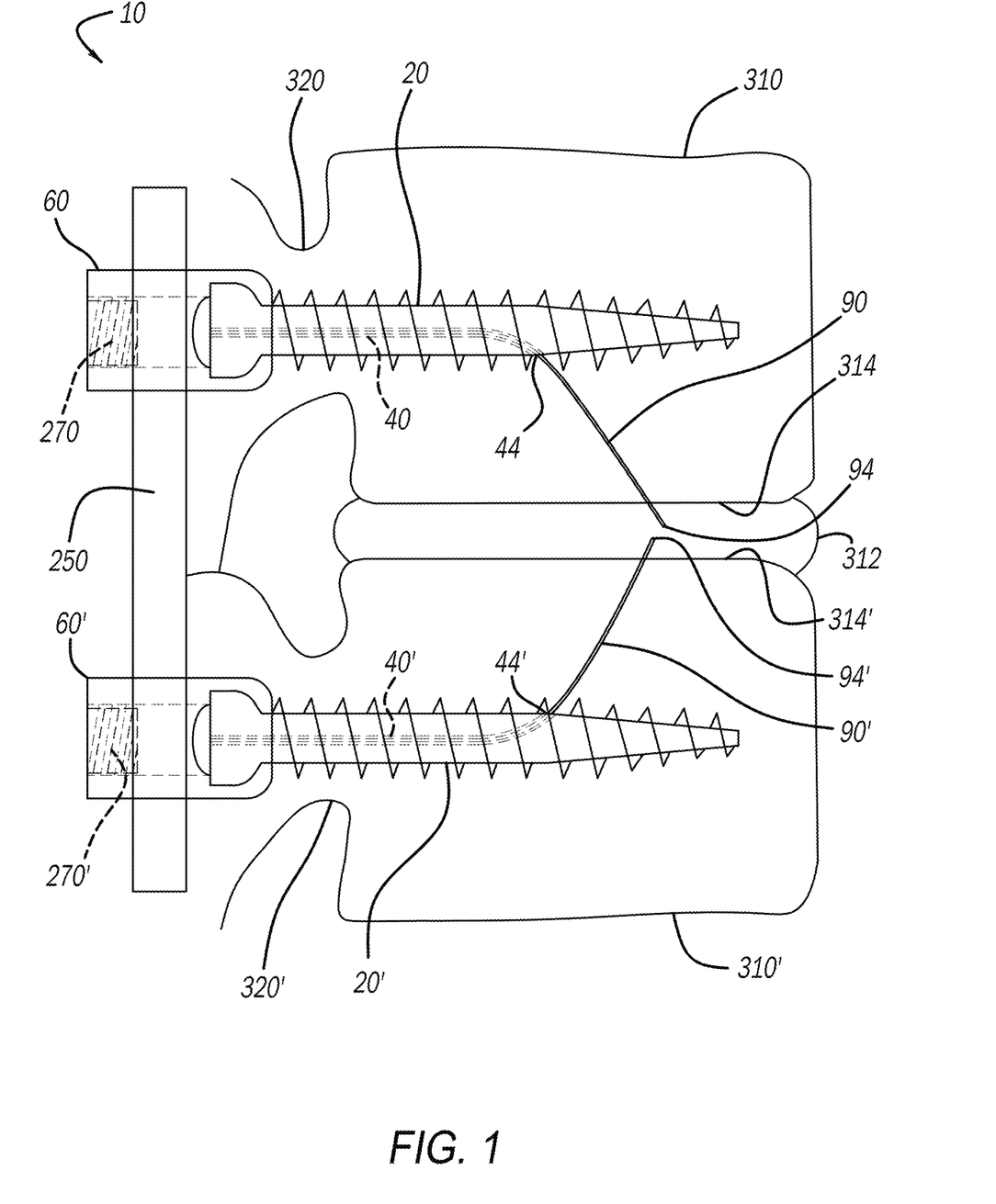
FIG. 1 illustrates an exemplary spinal fixation system of the present disclosure implanted within a spine.

FIG. 1 illustrates an exemplary motion segment fixation system in accordance with the present teachings configured as a spinal fixation system 10. In the example of FIG. 1, the spinal fixation system 10 generally includes a pedicle screw 20 implanted in a vertebral body 310, which has a pedicle 320 associated therewith. Coupled to the pedicle screw 20 is a tulip head 60. To enhance fixation of the pedicle screw 20 in the vertebral body 310, a nail 90 is inserted through a channel 40 (FIGS. 2A, 2B, 2C, for example) of the pedicle screw 20 and into the vertebral body 310. The nail 90 may be implanted to extend into an endplate portion 314 of the vertebral body 310, where the nail 90 may achieve purchase in the cortical bone of the endplate portion 314. The pedicle screw 20 is configured and implanted such that the nail 90 exits the channel 40 at a point within the vertebral body 310 beyond the pedicle 320 to enhance fixation.

A fixation rod 250 is mounted to the tulip head 60, and held in place with a set screw 270. The fixation rod 250 extends to another tulip head 60' coupled to another pedicle screw 20' implanted in an adjacent vertebral body 310' with an associated pedicle 320'. An intervertebral disc 312 is between the vertebral bodies 310, 310'. The fixation rod 250 is affixed to the tulip head 60' with a set screw 270'. Another nail 90' extends through the pedicle screw 20' into the vertebral body 310', and optionally into an adjacent endplate portion 314'. The pedicle screw 20', the tulip head 60', and the nail 90' are the same as, or substantially similar to, the pedicle screw 20, the tulip head 60, and the nail 90. Thus, the description herein of the pedicle screw 20, the tulip head 60, and the nail 90 is also sufficient to describe the pedicle screw 20', the tulip head 60', and the nail 90'.

Figures 2A, 2B, 2C:
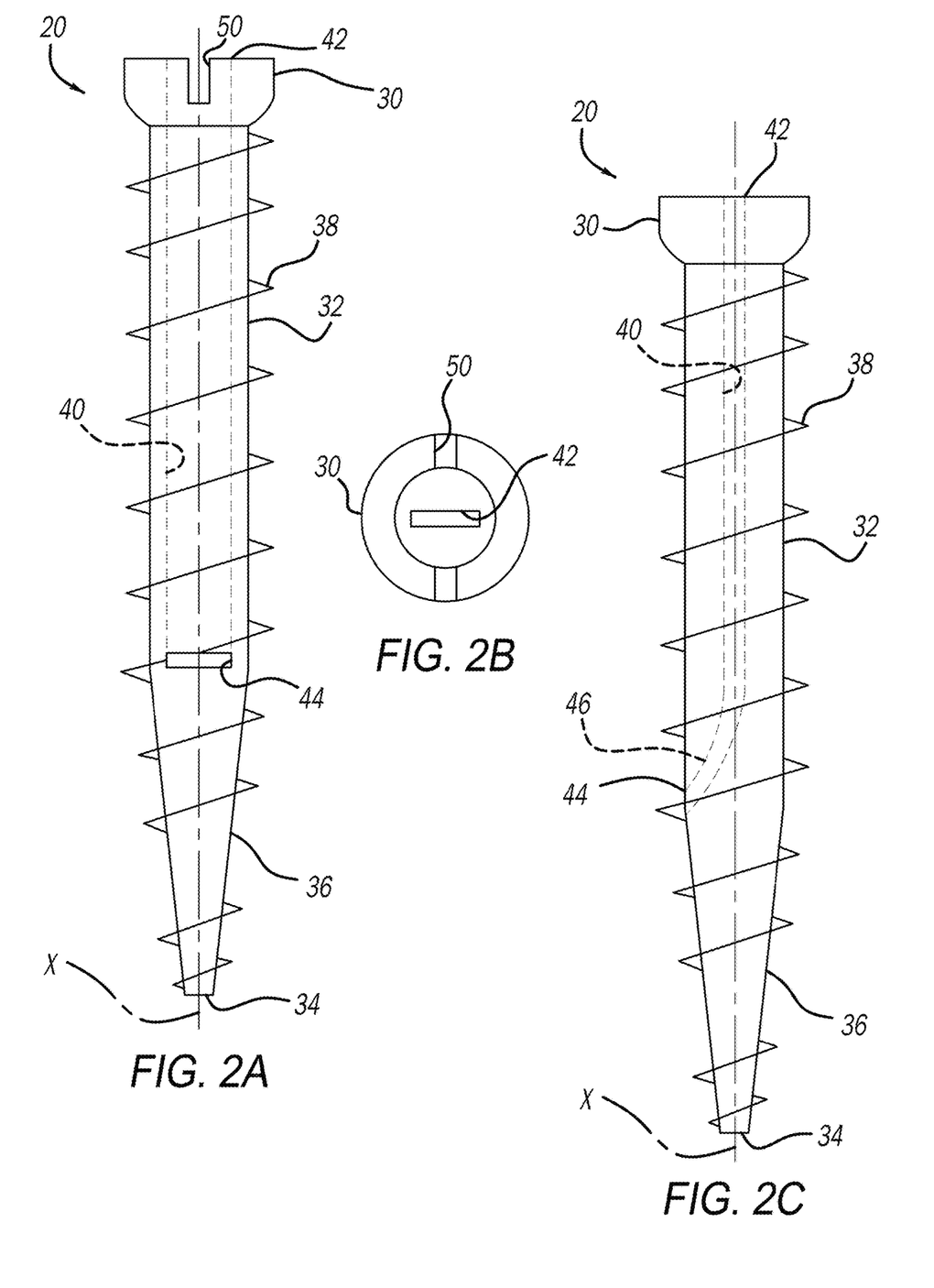
FIG. 2A is a side view of an exemplary pedicle screw of the spinal fixation system of FIG. 1.
FIG. 2B is a top view of the pedicle screw of FIG. 2A.
FIG. 2C is another side view of the pedicle screw, the pedicle screw rotated relative to the position of FIG. 2A.

With reference to FIGS. 2A, 2B, and 2C, the pedicle screw 20 will be described in additional detail. The pedicle screw 20 generally includes a screw head 30, a screw body 32 extending from the screw head 30, and a screw tip 34 at a distal end of the screw body 32 opposite to the screw head 30. The screw body 32 includes a tapered body 36, which tapers inward towards a longitudinal axis X of the pedicle screw 20. The screw body 32 progressively tapers towards the longitudinal axis X until reaching the screw tip 34. At an exterior of the screw body 32 are screw threads 38, which are configured to engage the vertebral body 310 to facilitate implantation and facilitate retention within the vertebral body 310.

The channel 40 is defined within the pedicle screw 20. The channel 40 extends from a first opening 42 at the screw head 30 to a second opening 44 at a side of the screw body 32. With particular reference to FIG. 2C, the channel 40 includes a curved end 46. From the first opening 42 to the curved end 46, the channel 40 extends along the longitudinal axis X of the pedicle screw 20. The curved end 46 extends from the longitudinal axis X to the second opening 44 at the side of the screw body 32. The second opening 44 is at the portion of the screw body 32 that is not tapered. The tapered body 36 begins just distal to the second opening 44. The channel 40 may have any suitable shape, such as a shape that matches the nail 90. In the example illustrated, the channel 40 has a rectangular cross-section. The pedicle screw 20 further defines a notch 50 configured to accommodate a removal tool for removing the nail 90. The notch 50 is at the screw head 30.

The pedicle screw 20 may have any suitable length, such as 35-65 mm depending on patient anatomy. A maximum screw core diameter of the pedicle screw 20 may be 5-8 mm, for example, but may also vary depending on anatomy. The width of the channel 40 will vary depending on the maximum screw core diameter and the size of the nail 90. The length of the channel 40 is configured such that the nail 90 exiting the channel 40 through the second opening 44 will not penetrate the vertebral body 310 until the nail 90 has passed a junction of the pedicle 320 and the vertebral body 310. The second opening 44 is at any suitable position along the length of the screw body 32. For example, the second opening 44 may be spaced apart 25-35 mm from a top surface of the screw head 30.

Figures 3A, 3B, 3C:
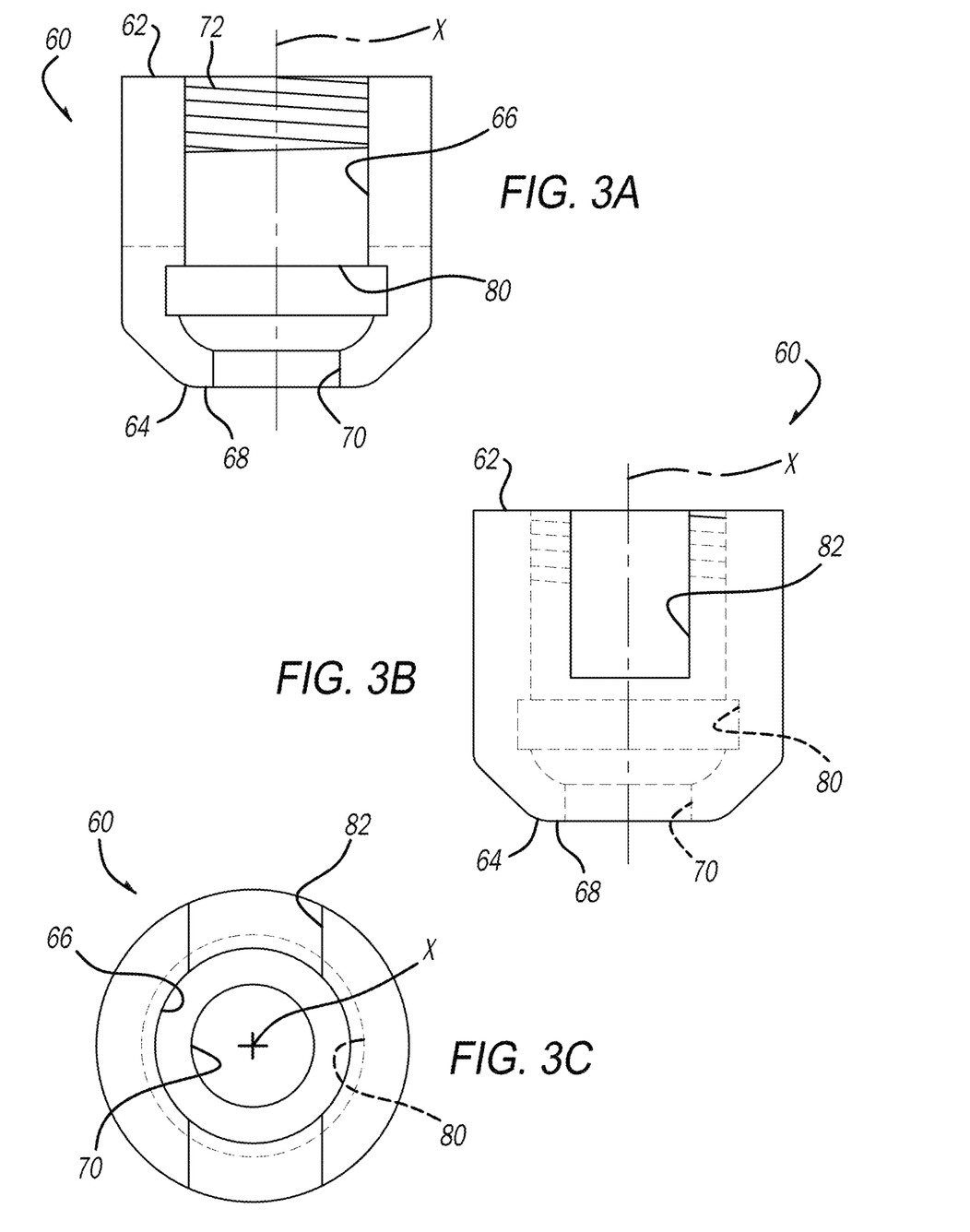
FIG. 3A is a cross-sectional view of an exemplary tulip head of the spinal fixation system of FIG. 1.
FIG. 3B is a side view of the tulip head.
FIG. 3C is a top view of the tulip head.

With particular reference to FIGS. 3A, 3B, and 3C, the tulip head 60 will now be described further. The tulip head 60 generally includes a first end 62 and a second end 64 opposite to the first end 62. The tulip head 60 defines a bore 66 extending through the tulip head 60 from the first end 62 to the second end 64. At the second end 64, the tulip head 60 includes a collar 68, which defines an aperture 70. Defined within the bore 66 are tulip threads 72 and a cavity 80. The tulip threads 72 are at the first end 62 and configured to cooperate with any suitable inserter for the nail 90. The cavity 80 is configured to receive the screw head 30, and is defined proximate to the second end 64. The cavity 80 has a diameter that is greater than a remainder of the bore 66 to lock the screw head 30 within the cavity 80. The tulip head 60 is mounted to the screw head 30 in any suitable manner to allow the tulip head 60 to rotate about the screw head 30. For example, the tulip head 60 may be three-dimensionally printed on the screw head 30. The screw body 32 extends through the aperture 70 defined by the collar 68, and the collar 68 is between the screw head 30 and the screw threads 38.

With particular reference to FIGS. 3B and 3C, the tulip head 60 defines a slot 82. The slot 82 is configured to accommodate the fixation rod 250 therein. The slot 82 extends perpendicular to the longitudinal axis X. The tulip head 60 is rotatable to align the slot 82 with a corresponding slot of the tulip head 60' to permit attachment of the fixation rod 250. After the fixation rod 250 is seated in the slot 82, the set screw 270 (FIG. 1) is screwed into the tulip threads 72 to secure the fixation rod 250 in place. The set screw 270 provides a compression fit to restrict rotation of the tulip head 60 around the screw head 30.

Figures 4A, 4B, 5A:
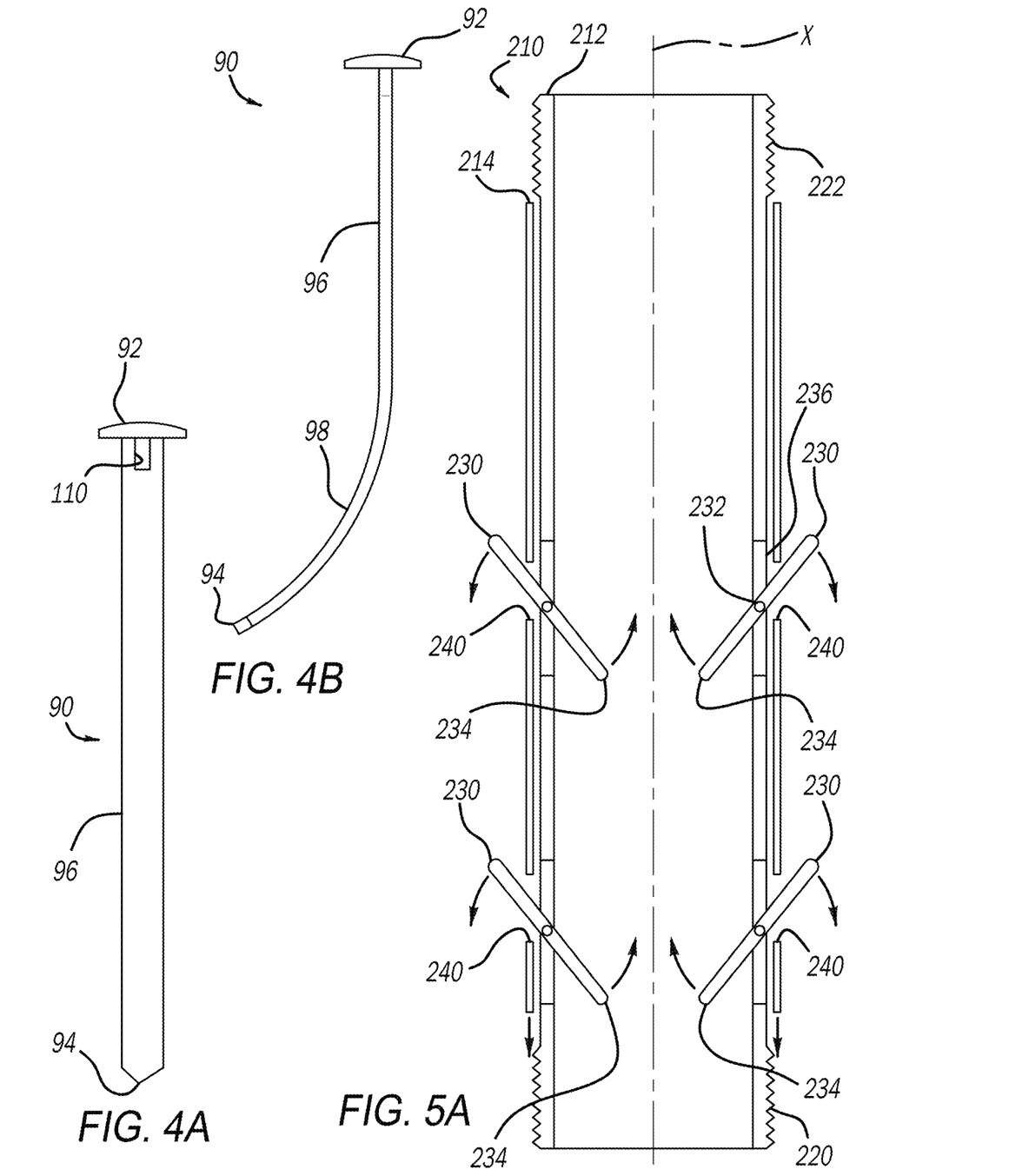
FIG. 4A is a side view of an exemplary nail of the spinal fixation system of FIG. 1.
FIG. 4B is another side view of the nail, the nail rotated relative to the position of FIG. 4A.
FIG. 5A is a cross-sectional view of an exemplary inserter of the spinal fixation system of FIG. 1.

With reference to FIGS. 4A and 4B, the nail 90 generally includes a nail head 92, a nail tip 94, and a nail body 96 with a curved portion 98. With particular reference to FIG. 4A, the nail body 96 defines a window 110, which is proximate to the nail head 92. The window 110 is configured to receive any suitable tool for removing the nail 90 after it has been implanted, such as during a revision procedure. In the example illustrated, the nail 90 has a rectangular cross-section. The nail 90 may have any other suitable shape as well. The nail tip 94 is pointed to facilitate implantation in the vertebral body 310 and allow penetration into the cortical bone of the adjacent endplate. The nail 90 may be made of any suitable material, such as a flexible metallic material. The nail 90 is made of a shape memory material, which allows the nail 90 to be straightened during insertion through the pedicle screw 20, and reassume a curved shape at the curved end 46 of the channel 40 and after the nail 90 exits the channel 40. The nail 90 may have any suitable dimensions, which may be varied based on patient anatomy. For example, the nail 90 may have a length that is the same as, or about the same as, the length of the pedicle screw 20. The nail 90 may have a width of 3-5 mm and a depth of 1 mm, for example, or any other suitable dimensions to allow the nail 90 to be inserted through the channel 40.

The nail 90 is inserted into the pedicle screw 20 using any suitable insertion tool, such as an inserter 210 illustrated in FIGS. 5A, 5B, 5C, and 6, for example. The inserter 210 generally includes an inner cannula 212 and an outer cannula 214. The inner cannula 212 includes distal threads 220 and proximal threads 222 at opposite ends of an exterior of the inner cannula 212. Mounted to a sidewall of the inner cannula 212 are alignment members 230. The alignment members 230 may be configured as pins, for example.

Figures 5B, 5C:
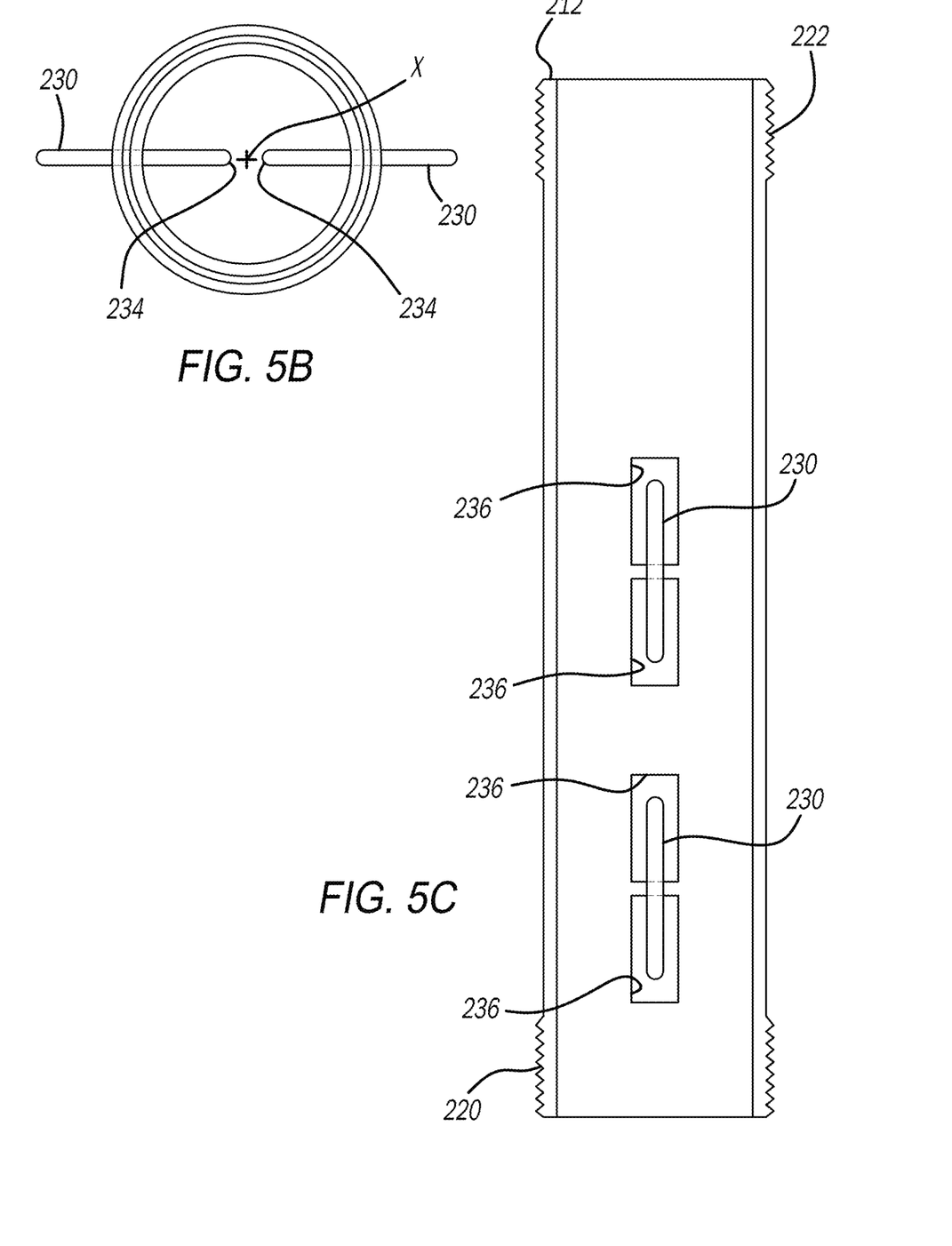
FIG. 5B is a top view of the inserter.
FIG. 5C is a cross-sectional view of an inner cannula of the inserter.

The alignment members 230 are arranged in pairs, such that each alignment member 230 is opposite to another alignment member 230. Any suitable number of alignment members 230 may be included. For example, and as illustrated, two pairs of alignment members 230 may be included for a total of four alignment members 230. Each one of the alignment members 230 is mounted to the inner cannula 212 with any suitable fastener 232, and the alignment members 230 pivot about their respective fasteners 232. Each alignment member 230 includes an inner tip 234, which is within the inner cannula 212. The alignment members 230 are each seated in openings 236 defined in the inner cannula 212. Outer portions of the alignment members 230 extend from the openings 236 into windows 240 defined by the outer cannula 214.

Figure 6:
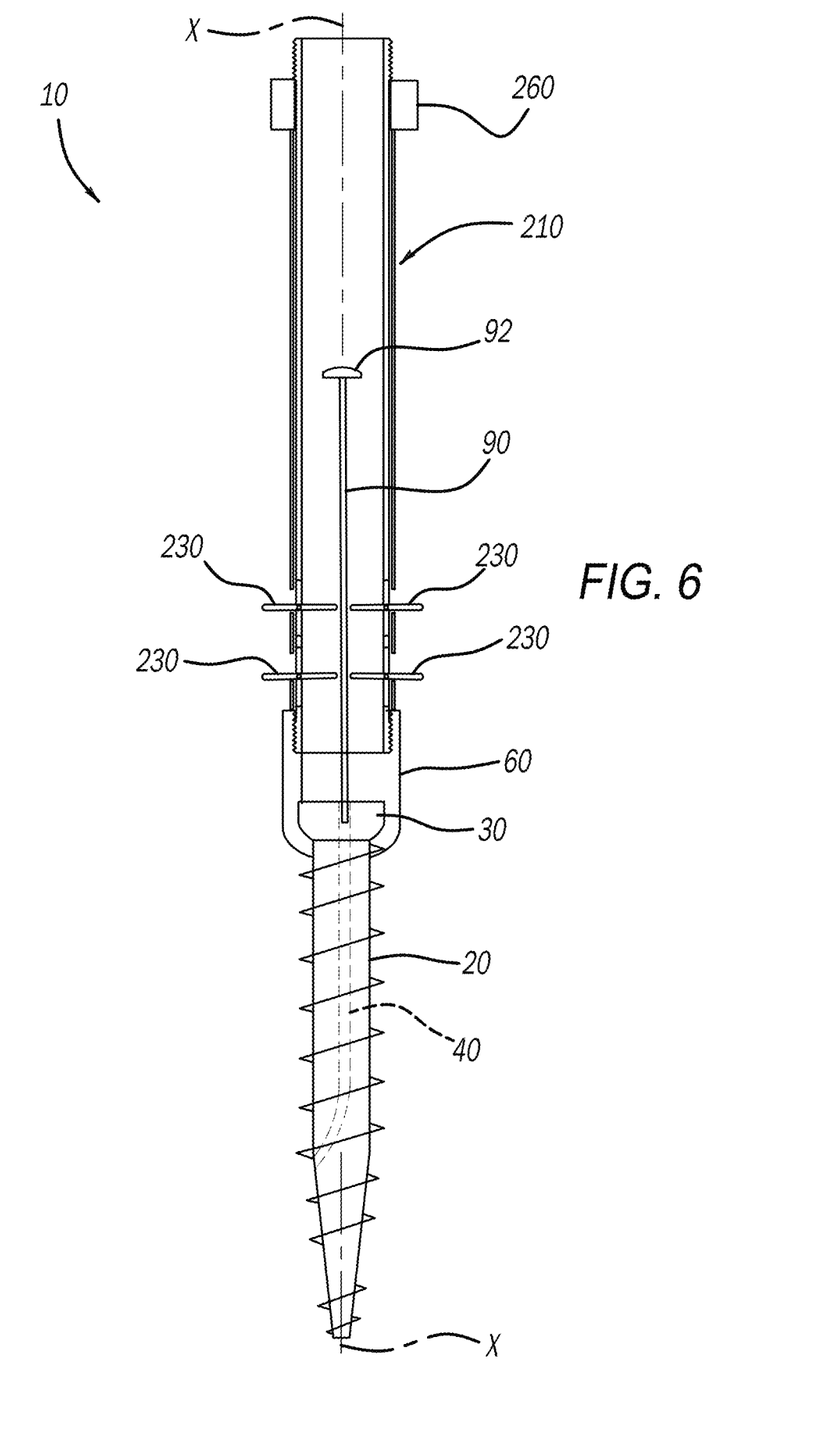
FIG. 6 is a cross-sectional view of the pedicle screw with the tulip head mounted thereto, and the inserter coupled to the tulip head.

The outer cannula 214 is movable relative to the inner cannula 212. Due to cooperation between the alignment members 230 and the windows 240 of the outer cannula 214, movement of the outer cannula 214 relative to the inner cannula 212 rotates each one of the alignment members 230 between a deployed position (FIGS. 5B and 6, for example) and a stowed or retracted position (FIG. 5A, for example). The outer cannula 214 may be moved in any suitable manner. For example, and as illustrated in FIG. 6, a bolt 260 is threaded onto the proximal threads 222 of the inner cannula 212. Rotation of the bolt 260 to move the bolt 260 in a direction towards the outer cannula 214 will result in the bolt 260 contacting and pushing the outer cannula 214 to move the outer cannula 214 relative to the inner cannula 212. Rotation of the bolt 260 in an opposite direction will move the bolt 260 away from the outer cannula 214 to allow the outer cannula 214 to be moved in an opposite direction.

In the deployed position, the inner tips 234 of opposing alignment members 230 are closest to each other, and closest to the longitudinal axis X of the inserter 210 (which as illustrated in FIG. 6 is aligned with the longitudinal axis X of the pedicle screw 20. In the deployed position, each one of the alignment members 230 is perpendicular to, or generally perpendicular to, the longitudinal axis X. And the alignment members 230 of each opposing pair are colinear in the deployed position. In the stowed/retracted position, the inner tips 234 of opposing alignment members 230 are spaced apart any suitable distance to accommodate passage of the nail head 92 of the nail 90 past the alignment members 230 into the tulip head 60 and the pedicle screw 20.

An exemplary method of using and implanting the spinal fixation system 10 will now be described in detail. The pedicle screw 20 (with the tulip head 60 mounted thereto) is first implanted in the vertebral body 310 such that the opening 44 of the channel 40 is beyond the pedicle 320. The inserter 210 is then mounted to the tulip head 60, such as through cooperation between the distal threads 220 of the inner cannula 212 and the tulip threads 72. The nail 90 is pushed into the inner cannula 212 of the inserter 210 with the pairs of the alignment members 230 rotated such that the inner tips 234 are spaced apart far enough to accommodate passage of the nail 90 in the relaxed configuration of FIG. 4B, whereby the curved portion 98 is curved as illustrated. The nail 90 is pushed into the inner cannula 212 until the curved portion 98 is at the alignment members 230. The alignment members 230 are then moved to the deployed position illustrated in FIGS. 5B and 6 to straighten the curved portion 98 and facilitate insertion of the nail 90 into the channel 40. More specifically, the bolt 260 is rotated on the proximal threads 222 to push the outer cannula 214 and slide the outer cannula 214 relative to the inner cannula 212, which moves the alignment members 230 to the deployed positions due to the cooperation between the alignment members 230 and the outer cannula 214.

As the alignment members 230 rotate to the deployed position, the alignment members 230 contact the curved portion 98 to straighten the curved portion 98 and center the nail 90 along the longitudinal axis X. With the curved portion 98 straightened as illustrated in FIG. 6, the nail 90 is pushed further into the channel 40. When the nail head 92 reaches the alignment members 230, the bolt 260 is rotated in the opposite direction to allow the outer cannula 214 to slide back towards the bolt 260, which rotates the alignment members 230 apart, such as to the position of FIG. 5A to allow the nail head 92 to be moved past the alignment members 230 and into the screw head 30. The nail 90 is advanced through the channel 40 and the nail tip 94 eventually exits through the second opening 44 and moves into engagement with the vertebral body 310, including the endplate portion 314 of the vertebral body 310. The curved portion 98 helps direct the nail tip towards the neighboring vertebral body 310', and the nail tip 94 may extend into the endplate portion 314 of the vertebral body 310 depending on the length of nail 90 selected. After the nail 90 is implanted, the inserter 210 is decoupled from the tulip head 60, and may be used to insert another nail, such as the nail 90'.

The pedicle screw 20' and the nail 90' are implanted in the adjacent vertebral body 310' in the same manner described above with respect to the pedicle screw 20 and the nail 90. After the pedicle screws 20, 20' and the nails 90, 90' have been implanted, the tulip heads 60, 60' are rotated so that the slot 82 of the tulip head 60 aligns with a corresponding slot of the tulip head 60'. The fixation rod 250 is then seated in the slots 82, 82'. To secure the fixation rod 250 in position, the set screw 270 is screwed into cooperation with the tulip threads 72, and the set screw 270' is screwed into cooperation with threads of the tulip head 60'. The set screws 270, 270' also rotationally lock the respective tulip heads 60, 60' by a compression fit. The nails 90, 90' may be positioned in any suitable orientation. For example and as illustrated in FIG. 1, the nails 90, 90' may be oriented to extend towards one another to enhance fixation. Furthermore, the nails 90, 90' may be implanted in the vertebral bodies 310, 310' at any suitable orientation relative to the longitudinal axes X of the pedicle screws 20, 20', such as any suitable non-orthogonal angles.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A spinal fixation system comprising:
   a pedicle screw including a screw head, a screw tip opposite to the screw head, a screw body extending from the screw head to the screw tip, and a channel extending from a first opening defined in the screw head to a second opening defined at a side of screw body;
   a tulip head defining a cavity configured to accommodate the screw head, and defining a slot configured to accommodate a fixation rod;
   a nail including a nail head, a nail tip, and a nail body extending from the nail head to the nail tip, the nail body including a curved portion that is flexible; and
   an inserter configured to cooperate with the tulip head, the inserter including an inner cannula seated within an outer cannula that is movable relative to the inner cannula, the inner cannula including alignment members in cooperation with the outer cannula such that movement of the outer cannula relative to the inner cannula moves the alignment members from a stowed position to a deployed position, in the deployed position the alignment members are configured to center the nail when inserted within the inner cannula and straighten the curved portion of the nail to facilitate insertion of the nail through the tulip head and into the channel of the pedicle screw.

2. The spinal fixation system of claim 1, wherein the channel and the nail are both rectangular in cross-section.

3. The spinal fixation system of claim 1, wherein the screw body is tapered inward from the second opening of the channel to the screw tip.

4. The spinal fixation system of claim 1, wherein the pedicle screw is configured such that when fully implanted in a vertebral body the second opening of the channel is beyond a junction between the vertebral body and a pedicle bone of the vertebral body.

5. The spinal fixation system of claim 4, wherein the second opening of the channel is spaced apart 25-35 mm from a top surface of the screw head.

6. The spinal fixation system of claim 1, wherein the tulip head further includes:
   a collar defining an aperture, when the screw head is locked within the cavity the screw body extends through the aperture and the collar is between the screw head and screw threads; and
   internal tulip threads adjacent to the slot configured to cooperate with a set screw to retain the fixation rod within the slot.

7. The spinal fixation system of claim 1, wherein the nail is made of a shape-memory alloy.

8. The spinal fixation system of claim 1, wherein:
   the inner cannula of the inserter further includes distal threads and proximal threads at opposite ends of the inner cannula, the distal threads are configured to cooperate with tulip threads of the tulip head, and the proximal threads are configured to cooperate with a bolt;
   rotation of the bolt in a first direction presses the bolt against the outer cannula to slide the outer cannula towards the distal threads and move the alignment members from the stowed position to the deployed position; and
   rotation of the bolt in a second direction opposite to the first direction moves the bolt away from the outer cannula to allow the outer cannula to slide away from the distal threads and move the alignment members from the deployed position to the stowed position, and to allow the nail head to move past the alignment members.

9. The spinal fixation system of claim 1, wherein:
   the alignment members are pins rotatably mounted to the inner cannula, the pins are arranged in opposing pairs;
   in the deployed position, the pins of the opposing pairs are colinear; and
   in the stowed position, the pins are rotated relative to the deployed position such that opposing tips of the pins of the opposing pairs are spaced farther apart as compared to the deployed position.

10. The spinal fixation system of claim 1, wherein the tulip head is rotatable about the screw head to align the slot with another slot of another tulip head implanted in an adjacent vertebral body.

11. The spinal fixation system of claim 1, wherein the nail defines a window proximate to the nail head, the window configured to receive a removal tool for removing the nail.

12. A method for implanting a spinal fixation system, the method comprising:
- implanting a pedicle screw in a vertebral body, the pedicle screw including a screw head, a screw tip opposite to the screw head, a screw body extending from the screw head to the screw tip, a channel extending from a first opening defined in the screw head to a second opening defined at a side of screw body, and a tulip head seated on the screw head;
- connecting an inserter to the tulip head of the pedicle screw, the inserter including an inner cannula seated within an outer cannula that is movable relative to the inner cannula, the inner cannula including alignment members in cooperation with the outer cannula such that movement of the outer cannula relative to the inner cannula moves the alignment members from a stowed position to a deployed position;
- arranging a nail inside the inner cannula of the inserter with the alignment members in the stowed position, the nail including a nail head, a nail tip, and a nail body extending from the nail head to the nail tip, the nail body including a curved portion that is flexible;
- with the nail inside the inner cannula, moving the outer cannula relative to the inner cannula to move the alignment members to the deployed position and into cooperation with the nail to straighten the curved portion;
- inserting the nail into the channel until the curved portion enters the channel;
- with the curved portion within the channel, moving the outer cannula relative to the inner cannula to move the alignment members from the deployed position to the stowed position to allow the nail head to pass the alignment members;
- further inserting the nail into the channel until the nail head is seated in the screw head and the nail body extends through the second opening and into the vertebral body to implant the nail within the vertebral body;
- decoupling the inserter from cooperation with the tulip head after the nail is implanted;
- mounting a fixation rod the tulip head over the nail head; and
- attaching a set screw to the tulip head over the fixation rod.

13. The method of claim 12, wherein implanting the pedicle screw includes positioning the pedicle screw such that the second opening of the channel is implanted beyond a junction between the vertebral body and a pedicle bone of the vertebral body.

14. The method of claim 12, further comprising rotating the tulip head about the screw head to align a slot of the tulip head with another slot of another tulip head implanted in an adjacent vertebral body.

15. The method of claim 12, wherein moving the outer cannula relative to the inner cannula to move the alignment members includes sliding the outer cannula relative to the inner cannula.

16. The method of claim 12, wherein moving the outer cannula relative to the inner cannula to move the alignments members to the deployed position includes rotating a bolt on the inner cannula such that the bolt pushes the outer cannula towards the tulip head.

17. The method of claim 12, further comprising implanting the nail within the vertebral body such that the nail tip engages an endplate of the vertebral body.

18. The method of claim 12, further comprising implanting the nail within the vertebral body at a non-orthogonal angle relative to a longitudinal axis of the pedicle screw.

19. The method of claim 12, wherein the alignment members are configured to align the nail along a longitudinal axis of the pedicle screw.

20. The method of claim 12, wherein the vertebral body is a first vertebral body, the pedicle screw is a first pedicle screw, the tulip head is a first tulip head, and the nail is a first nail, the method further comprising:
- implanting a second pedicle screw in a second vertebral body that is adjacent to the first vertebral body, the second pedicle screw is identical to the first pedicle screw; and
- inserting a second nail through the second pedicle screw and implanting the second nail within the second vertebral body;
- wherein mounting the fixation rod further includes mounting the fixation rod to a second tulip head connected to the second pedicle screw, and securing the fixation rod with another set screw in cooperation with the second tulip head.

* * * * *